(12) United States Patent
Furuta et al.

(10) Patent No.: US 9,325,769 B2
(45) Date of Patent: Apr. 26, 2016

(54) PROCESSING CONTROL SERVER, PROCESSING CONTROL METHOD, AND PROCESSING TERMINAL

(75) Inventors: Yasuhiro Furuta, Shimosuwa-machi (JP); Yasuhiro Oshima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 617 days.

(21) Appl. No.: 13/596,664

(22) Filed: Aug. 28, 2012

(65) Prior Publication Data
US 2013/0060950 A1 Mar. 7, 2013

(30) Foreign Application Priority Data
Sep. 1, 2011 (JP) .................. 2011-190411

(51) Int. Cl.
- G06F 15/16 (2006.01)
- H04L 29/08 (2006.01)
- G06F 3/12 (2006.01)

(52) U.S. Cl.
CPC .............. *H04L 67/02* (2013.01); *G06F 3/1203* (2013.01); *G06F 3/1265* (2013.01); *G06F 3/1274* (2013.01); *G06F 3/1287* (2013.01); *G06F 3/1288* (2013.01); *G06F 3/1228* (2013.01)

(58) Field of Classification Search
CPC ...................................... H04N 1/002
USPC ........................................ 358/1.15
See application file for complete search history.

(56) References Cited

U.S. PATENT DOCUMENTS

| | | | |
|---|---|---|---|
| 2003/0035133 A1* | 2/2003 | Berkema et al. | 358/1.15 |
| 2006/0095500 A1* | 5/2006 | Kato | 709/201 |
| 2008/0068646 A1* | 3/2008 | Kobayashi | 358/1.15 |
| 2011/0194140 A1* | 8/2011 | Sweet et al. | 358/1.15 |
| 2011/0255128 A1* | 10/2011 | Ozawa | 358/1.15 |
| 2011/0299130 A1* | 12/2011 | Ito | 358/442 |
| 2011/0310433 A1* | 12/2011 | Hagiwara | 358/1.15 |
| 2012/0019865 A1* | 1/2012 | Takahashi et al. | 358/1.15 |
| 2012/0050795 A1* | 3/2012 | Nakamura | 358/1.15 |
| 2012/0050805 A1* | 3/2012 | Fukasawa | 358/1.15 |
| 2012/0062935 A1* | 3/2012 | Kamath et al. | 358/1.15 |
| 2012/0113459 A1* | 5/2012 | Williams et al. | 358/1.15 |
| 2012/0229844 A1* | 9/2012 | Yada et al. | 358/1.15 |
| 2012/0240062 A1* | 9/2012 | Passmore et al. | 715/758 |
| 2012/0300251 A1* | 11/2012 | St. Laurent et al. | 358/1.15 |
| 2013/0046970 A1* | 2/2013 | Abe | 713/152 |
| 2013/0346509 A1* | 12/2013 | Elkins et al. | 709/206 |

FOREIGN PATENT DOCUMENTS

| | | |
|---|---|---|
| JP | 2003-091377 A | 3/2003 |
| JP | 2007-328558 A | 12/2007 |
| JP | 2008-071257 A | 3/2008 |

OTHER PUBLICATIONS

Lane, (Apr. 15, 2011). Managing Google Cloud Printers. Retrieved from http://cloud.dzone.com/news/managing-google-cloud-printers.*

* cited by examiner

*Primary Examiner* — Kristie Shingles
*Assistant Examiner* — Timothy Sowa
(74) *Attorney, Agent, or Firm* — Global IP Counselors, LLP

(57) ABSTRACT

A processing control server has a first communication unit that communicates with a processing terminal by using a first connection based on HTTP; a second communication unit that communicates with the processing terminal by using a second connection that is different from the first connection; and a processing control unit that transmits object data to the processing terminal based on HTTP after acquiring a processing request, and requests the processing terminal to cancel processing of the object data by using the second connection in response to acquisition of a cancellation request.

7 Claims, 3 Drawing Sheets

PROCESSING CONTROL SERVER, PROCESSING CONTROL METHOD, AND PROCESSING TERMINAL

CROSS-REFERENCE TO RELATED APPLICATIONS

This application claims priority to Japanese Patent Application No. 2011-190411 filed on Sep. 1, 2011. The entire disclosure of Japanese Patent Application No. 2011-190411 is hereby incorporated herein by reference.

BACKGROUND

1. Technical Field

The present invention relates to a processing control server, a processing control method, and a processing terminal, and particularly relates to a technology for immediately executing a request from a user via a server in a cloud computing system.

2. Background Technology

A cloud computing system has been known, which provides service for causing a specified printer to conduct printing by e-mail transmission (for example, Patent Document 1). This cloud computing system has a server, and when the server receives specified e-mail, the server generates print data corresponding to a specified printer based on the e-mail. The specified printer registered in the server acquires print data from the server and executes printing. Accordingly, a user can use a printer that is registered in the server even if a printer driver is not installed in a communication terminal such as a PC (personal computer) or a smartphone. In this system, when a printer associated with a specified e-mail address is registered in a server, any user who knows the e-mail address can use the printer.

Japanese Laid-open Patent Application No. 2008-71257 (Patent Document 1), is an example of the related art.

SUMMARY

Problems to be Solved by the Invention

Here, a situation will be described in which a user requests a cancellation of printing in a case where a printer is conducting printing while acquiring print data from a server based on HTTP (Hyper Text Transfer Protocol). In this situation, the server that has acquired the cancellation request from a communication terminal of the user causes the printer to cancel printing. First, a case where the server deletes a print data file to cause the printer to cancel printing will be described. Generally, however, an HTTP server has a structure in which a data file in the process of transmission can be accessed when the HTTP connection is disconnected until the file is closed. Thus, the transmission of the print data continues even if deletion of the print data file is attempted, and printing by the printer cannot be cancelled. Also, there is another problem that the server considers that the printing has been cancelled. Next, a case where the server deletes the print data file and also disconnects the HTTP connection to cause the printer to cancel printing will be described. However, in order to cancel the transmission of the print data from the HTTP server after starting the transmission of the print data in response to the request from the printer, it is necessary to conduct special processing that significantly increases load on the HTTP server because the agent requesting to execute processing and the agent requesting to cancel the processing are different. Next, a case where the server transmits a request of cancellation of printing to the printer based on HTTP and also deletes the print data file to cause the printer to cancel printing will be described. However, in order to transmit a request of cancellation of printing by HTTP during transmission of print data based on the same HTTP, it is necessary to conduct special processing that significantly increases load on the HTTP server because it is interruption of transmission processing of print data.

The advantage of the invention is to cancel processing by a processing terminal without increasing load on a server.

Means Used to Solve the Above-Mentioned Problems (1) In order to achieve the above-described advantage, a processing control server has a first communication unit that communicates with a processing terminal by using a first connection based on HTTP; a second communication unit that communicates with the processing terminal by using a second connection that is different from the first connection; and a processing control unit that transmits object data to the processing terminal based on HTTP after acquiring a processing request, and requests the processing terminal to cancel processing of the object data by using the second connection in response to acquisition of a cancellation request.

According to the invention, even if the object data is in the process of transmission to the processing terminal based on HTTP, a cancellation of processing of the object data is requested to the processing terminal by communicating with the processing terminal by using the second connection that is different from the first connection used for transmitting the processing data. Specifically, load on the processing control server can be controlled by separating transmission of object data and a cancellation request of processing of the object data with respect to a protocol level of the same stage as HTTP.

(2) In the processing control server to achieve the above-described advantage, the processing control unit determines whether or not the processing of the object data will be continued in the processing terminal based on a response to the cancellation request sent to the processing terminal, and the processing control unit deletes the object data when the processing of the object data is not continued, and delays deletion of the object data when the processing of the object data is continued.

The invention assumes that the specifications of the processing terminals are not made uniform. For example, in a case where a processing terminal is requested to cancel processing of object data after starting the processing, there is a good chance that the processing terminal will not cancel the processing. In such a case, since a response that the processing control server receives by requesting the processing terminal to cancel processing has a content showing an error, it becomes possible to determine whether or not the processing will be continued in the processing control server based on the response. In a case where the processing is continued, it is preferable to advise a user that processing to the cancellation request has failed, for example, rather than to immediately delete the object data.

(3) The processing control server to achieve the above-described advantage has a third communication unit that communicates with a management terminal, and the cancellation request can be acquired from the management terminal by using the third communication unit.

(4) Each of the first communication unit, the second communication unit, and the processing control unit can be constructed of a different computer, respectively.

The function of each unit described in the claims is achieved by hardware resources whose function is specified by the configuration itself, hardware resources whose function is specified by the program, or a combination thereof. Also, the function of each unit is not limited to one that is achieved by hardware resources physically independent of each other. For example, the server described in the claims is not limited to one that is achieved by one computer, and the server can be achieved as a group by combining a plurality of computers that take charge of each unit, respectively. Further, the invention can be implemented as a method, a computer program that causes a computer to achieve the above-described function, or a recording medium for the program. The recording medium for the computer program can be a magnetic recording medium, a magneto-optical recording medium, or any recording medium that will be developed in the future.

BRIEF DESCRIPTION OF THE DRAWINGS

Referring now to the attached drawings which form a part of this original disclosure.

DETAILED DESCRIPTION OF EXEMPLARY EMBODIMENTS

Hereinafter, embodiments of the invention will be explained with reference to the attached drawings. Corresponding elements in the respective drawings have the same reference symbol, and overlapping explanations will be omitted.

1. Configuration

Figure 1:
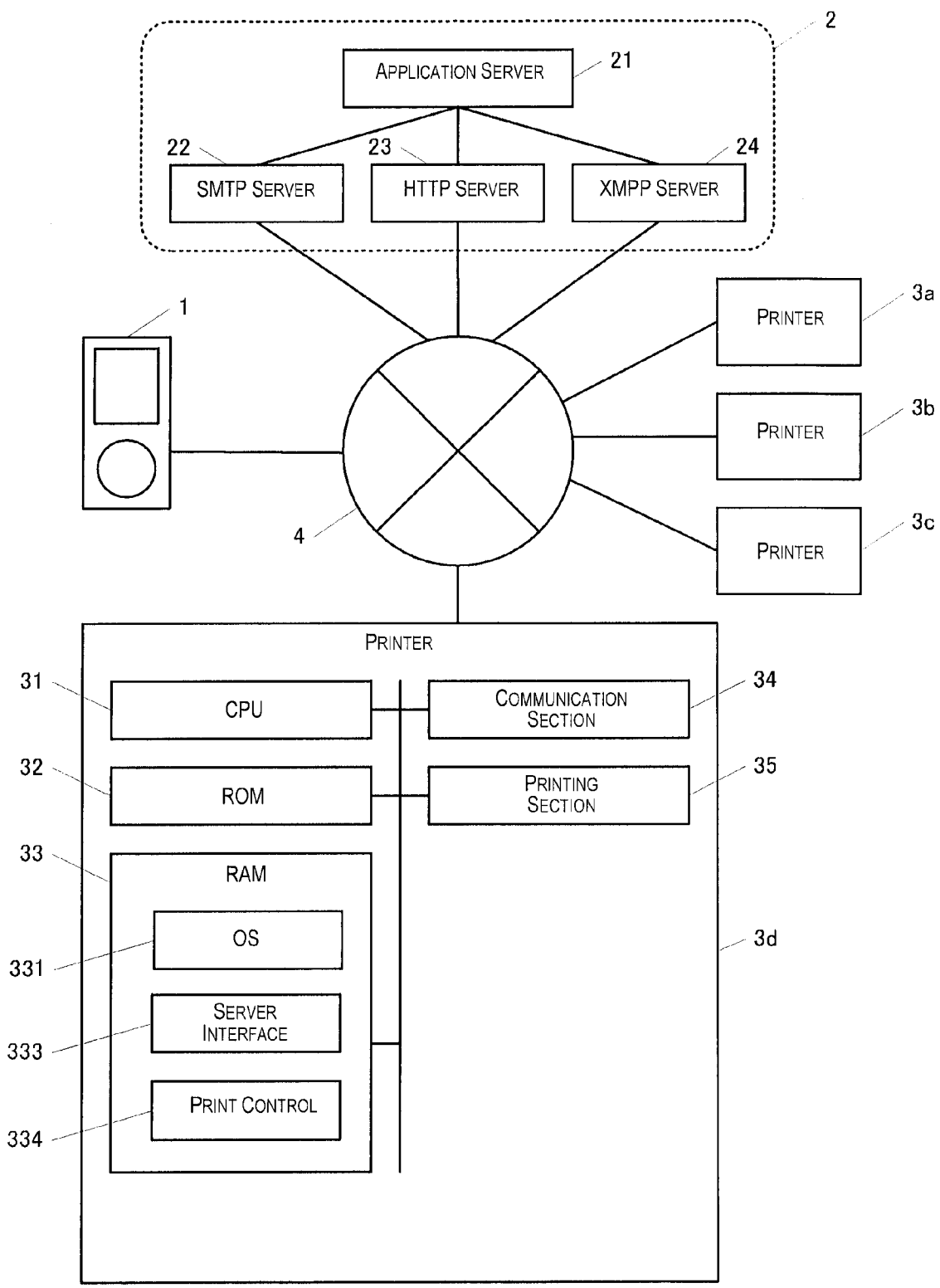
FIG. 1 is a block diagram showing an entire printing system that includes a processing control server, and a printer as a processing terminal.
Figure 2:
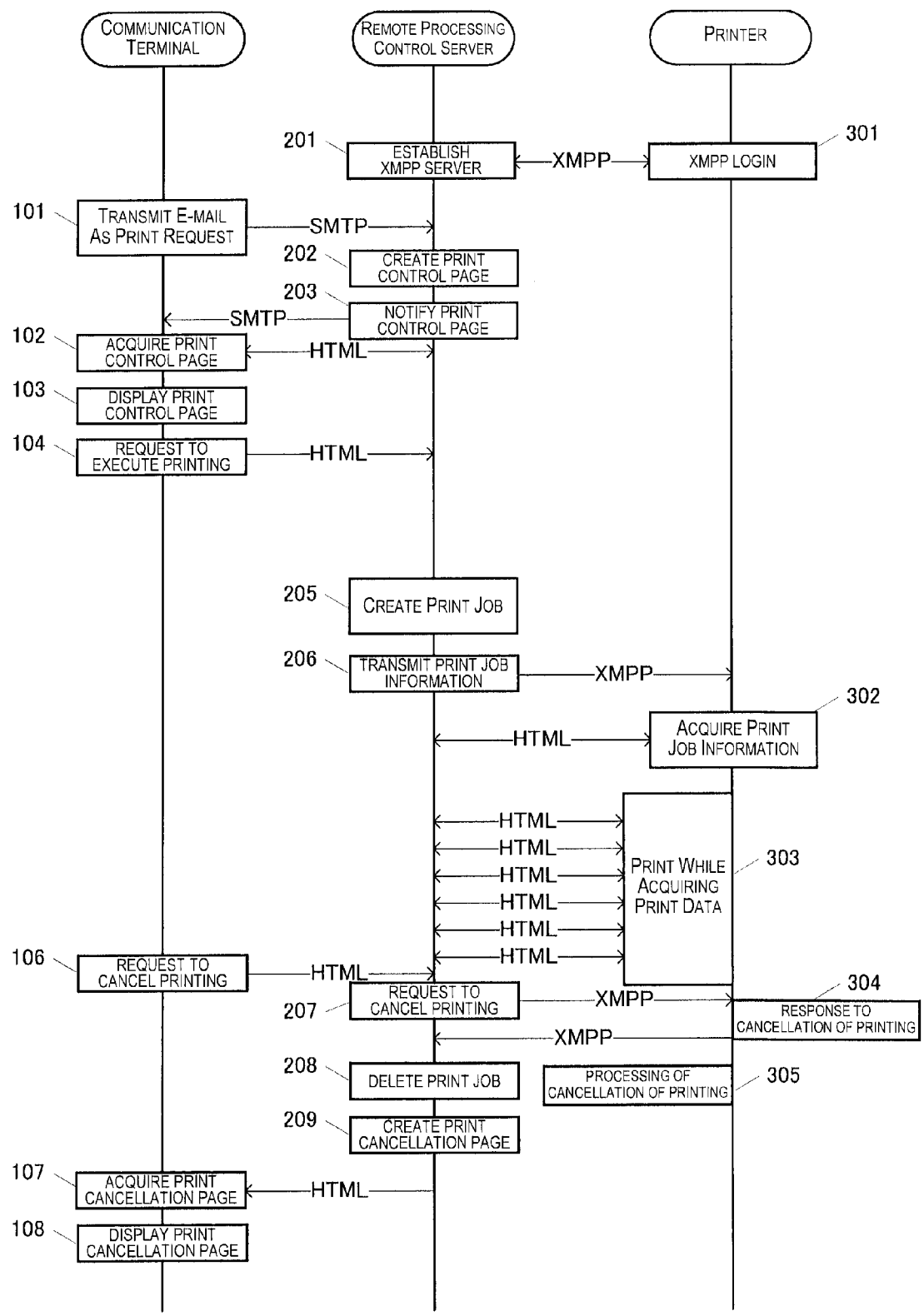
FIG. 2 is a sequence chart showing a processing control method.

FIG. 1 shows a configuration of an entire printing system that includes a processing control server 2 and printers 3a, 3b, 3c, and 3d as a processing terminal. In the printing system shown in FIG. 1, when an e-mail is transmitted from an optional communication terminal 1 to an e-mail address associated with any one of the printers 3a, 3b, 3c, and 3d registered in the processing control server 2, an attached file or a body text of the e-mail is printed by any one of the printers 3a, 3b, 3c, and 3d associated with the destination e-mail address. The processing control server 2, the printers 3a, 3b, 3c, and 3d, and the communication terminal 1 are connected with the Internet 4. Since the configurations of the printers 3a, 3b, 3c, and 3d are substantially the same in terms of understanding the invention, the configurations of the printers 3a, 3b, and 3c are omitted in FIG. 1. Also, the printers 3a, 3b, 3c, and 3d are described as a printer 3 in the following explanations, and the printers 3a, 3b, 3c, and 3d are not distinguished unless necessary. Incidentally, the printer 3 can be connected with the Internet 4 via a hub or a router.

The processing control server 2 is constructed of one or more computers, and includes an application server 21, an SMTP server 22, an HTML server 23, and an XMPP server 24. Each of the application server 21, the SMTP server 22, the HTML server 23, and the XMPP server 24 has a CPU, a RAM, a ROM, a hard disk device, a communication section, and an internal interface for connecting these, that are not shown in the drawing. The communication section converts signals received from the Internet via a LAN in accordance with a protocol and sends to an internal bus, and also converts signals obtained from the internal bus in accordance with a protocol and sends to the Internet via the LAN.

The SMTP server 22 sends and receives an e-mail in an e-mail address assigned to the printer 3 registered in the application server 21.

The HTML server 23 serves as the first communication unit that communicates with the printer 3 based on HTTP.

The XMPP server 24 serves as the second communication unit that communicates with the printer 3 based on XMPP (Extensible Messaging and Presence Protocol)

The application server 21 serves as the processing control unit. Specifically, when the application server 21 acquires a request to execute printing based on SMTP, the application server 21 generates print data in accordance with the corresponding printer 3, and transmits the generated print data to the corresponding printer 3 based on HTTP. Also, when the application server 21 acquires a request to cancel printing based on HTTP, the application server 21 requests the corresponding printer 3 to cancel printing based on XMPP.

The printer 3 executes printing based on a request to execute printing received from the processing control server 2 through an always-on connection with the processing control server 2. Accordingly, the printer 3 has a communication section 34 to send and receive messages via the Internet 4 in addition to standard elements of a printer such as a CPU 31, a ROM 32, a RAM 33, or a printing section 35. The communication section 34 converts signals received from the Internet 4 via a LAN in accordance with a protocol and sends to an internal bus, and also converts signals obtained from the internal bus in accordance with a protocol and sends to the Internet 4 via the LAN. The ROM 32 stores various kinds of computer programs to be read in the RAM 33 and to be executed by the CPU 31 such as an OS 331, a connection control module 332, a server interface module 333, or a print control module 334. Various kinds of functions of the printer 3 are achieved by causing the CPU 31 to execute these computer programs.

The OS 331 controls hardware of the printer 3 in cooperation with various kinds of application programs such as the connection control module 332, the server interface module 333, or the print control module 334, and controls communication with the processing control server 2 in accordance with a protocol such as TCP/IP, HTTP, or XMPP. The OS 331 is a computer program that causes the CPU 31 and the communication section 34 to serve as the first communication unit and the second communication unit. Account information necessary for the printer 3 to communicate with the processing control server 2 in accordance with a protocol such as TCP/IP, HTTP, or XMPP is set in the printer 3 and the processing control server 2 in advance.

The server interface module 333 acquires a request to execute printing, print data, or a request to cancel printing from the processing control server 2 by communicating with the processing control server 2 in accordance with a protocol such as HTTP or XMPP.

The print control module 334 acquires a request to execute printing, print data, or a request to cancel printing through the server interface module 333. When the print control module 334 acquires a request to execute printing, the print control module 334 controls the printing section 35 and executes printing based on print data. When the print control module 334 acquires a request to cancel printing, the print control module 334 cancels execution of printing. The print control module 334 is a computer program that causes the CPU 31 and the printing section 35 to serve as a processing unit.

2. Processing Control Method

Next, an explanation will be made on a processing control method for causing the above-described processing control server 2 to serve as a processing control server as an embodiment of the invention, and causing the printer 3 to serve as a processing terminal. In the printing system shown in FIG. 1, when a request to execute printing is issued from the communication terminal 1 to the processing control server 2, it is desired to immediately execute printing in the printer 3. When a request to cancel printing is issued from the communication terminal 1 to the processing control server 2, it is desired to immediately cancel printing in the printer 3. Also, in terms of load on the processing control server 2 and network traffic, it is not desired to conduct polling in the processing control server 2 by using a message based on HTTP in order for the printer 3 to immediately acquire a request to execute printing or a request to cancel printing. Thus, the printer 3 acquires a request to execute printing or a request to cancel printing based on XMPP from the processing control server 2. Since XMPP is a push-type protocol that can transmit messages bi-directionally, the printer 3 does not need polling of the processing control server 2. In a sequence explained below, processing of assigning an account to the printer 3 is conducted in the printer 3 and the processing control server 2 while referring to registration information of another printer that has already been registered in the application server 21. Here, the account is for the printer 3 to communicate with the processing control server 2, and examples of the account include a JID, an XMPP login password, or an e-mail address.

Every time a user powers up the printer 3 by pushing a power button of the printer 3 after powering down the printer 3 by pushing the power button, the printer 3 executes a login sequence for an XMPP connection with the processing control server 2 (S301). In the login sequence, the printer 3 conducts initialization processing of each section, and transmits account information such as a JID or an XMPP login password to the XMPP server 24. The XMPP server 24 that has acquired the XMPP account information establishes an XMPP connection with the printer 3 (S202). The XMPP connection established between the XMPP server 24 and the printer 3 in this manner is maintained until the printer 3 is powered down.

A user of the communication terminal 1 causes the printer 3 that has acquired a corresponding e-mail address to execute printing by operating a mail user agent (MUA). Specifically, a user of the communication terminal 1 creates an e-mail as a print request by operating the MUA, and sends the e-mail as a print request addressed to an e-mail address assigned to the printer 3 from the communication terminal 1 to the SMTP server 22 (S101).

When the SMTP server 22 receives the e-mail as a print request, the application server 21 creates a print control page and causes the HTML server 23 to store it (S202). A print control page is a web page for transmitting various print control commands from the communication terminal 1 to the printer 3 through the processing control server 2.

Figure 3:
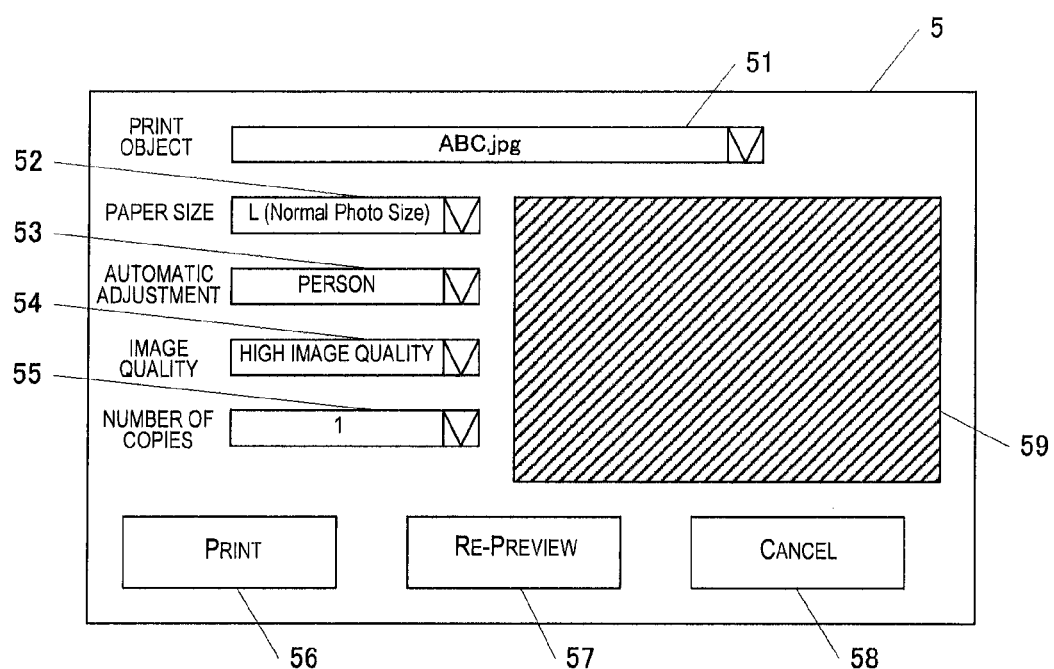
FIG. 3 is a plan view showing a processing control page.

FIG. 3 shows an example of the print control page. The print control page 5 is provided with various kinds of drop-down lists 51, 52, 53, 54 and 55, a print button 56, a re-preview button 57, a cancel button 58, and a preview image 59 of a print object file. The drop-down lists 51, 52, 53, 54 and 55 are for selecting a print object file, a paper size, the kind of automatic color conversion, an image quality level, a number of copies, and the like. The print button 56 is for transmitting a request to execute printing. The re-preview button 57 is for renewing the preview image 59 in a case where a user changes the kind of automatic color conversion, an image quality level, and the like. The cancel button 58 is for transmitting a request to cancel printing. The print control page 5 and the print objet file are associated with each other by the application server 21.

When the application server 21 creates the print control page 5, the application server 21 creates an e-mail that includes a URL for acquiring the print control page 5 and transmits it to the communication terminal 1 through the SMTP server 22 (S203). In this manner, information necessary for the communication terminal 1 to acquire the print control page 5 is sent from the processing control server 2 to the communication terminal 1.

By operating the MUA, a user of the communication terminal 1 causes a browser to acquire the URL for acquiring the print control page 5 included in the e-mail and causes the browser of the communication terminal 1 to transmit the URL to the HTML server 23. As a result, the communication terminal 1 acquires the print control page 5 from the HTML server 23 (S102), and displays the acquired print control page 5 on the screen (S103). The user of the communication terminal 1 that has acquired the print control page can request the printer 3 to start execution of printing and cancel execution of printing by operating the browser. The details are as follows.

When the print button 56 of the print control page 5 is clicked, a request to execute printing is transmitted to the processing control server 2 by the browser of the communication terminal 1 (S104). As a result, the application server 21 acquires the request to execute printing through the HTML server 23. The request to execute printing is an HTTP request that transmits the selection items of the drop-down lists 51, 52, 53, 54 and 55 to a URL that is programmed into the print button 56.

When the request to execute printing occurs in the processing control server 2 in this manner, the application server 21 creates a print job that includes print data corresponding to the printer 3 based on the print object acquired from the e-mail as a print request and the selection items of the drop-down lists 51, 52, 53, 54 and 55 (S205).

Next, the application server 21 notifies the printer 3 of the occurrence of the print job through the XMPP server 24 (S206). At the time of notifying the printer 3 of the occurrence of the print job, the URL for acquiring print job information necessary for acquiring the print data from the HTML server 23 is transmitted to the printer 3 through the XMPP server 24. Since XMPP is used for processing of notifying the printer 3 of the occurrence of the print job, the processing control server 2 can autonomously notify and polling from the printer 3 is not needed. Consequently, it is possible to immediately notify the printer 3 of the occurrence of the print job, and it is also possible to notify the printer 3 of the occurrence of the print job in a minimum amount of communication.

The printer 3 notified of the occurrence of the print job acquires print job information necessary for acquiring the print data from the processing control server 2 based on HTTP (S302). The print job information includes a URL from which the print data is downloaded.

The printer 3 that has acquired the print job information waits for the printer 3 to be put in the idle state. When the printer 3 is put in the idle state, the printer 3 acquires the print data by transmitting the URL from which the print data is downloaded to the HTML server 23, and executes printing based on the acquired print data (S303).

When a user of the communication terminal 1 that has acquired the print control page requests to start execution of printing by operating the browser and thus a request to execute printing occurs, the processing control server 2 transmits the print data as object data of printing to the printer 3 based on HTTP, which results in execution of printing in the printer 3.

On the other hand, if a user of the communication terminal 1 that has acquired the print control page clicks the cancel button 58 of the displayed print control page by operating the browser after the occurrence of the request to execute printing, a request to cancel printing is transmitted to the processing control server 2 by the browser of the communication terminal 1 (S106). As a result, the application server 21 acquires the request to cancel printing through the HTML server 23. The request to cancel printing is an HTTP request that includes a URL programmed into the cancel button 58.

If the application server 21 acquires the request to cancel printing after the printer 3 is notified of the occurrence of the print job in step S206, the application server 21 transmits the request to cancel printing to the printer 3 through the XMPP server 24 (S207). Specifically, when a request to cancel printing occurs, the processing control server 2 requests the printer 3 to cancel the execution of the printing based on XMPP that is a push-type protocol. The processing can be conducted by the XMPP server 24 even if the print data is being transmitted to the printer 3 by the HTML server 23. Further, since XMPP is a push-type protocol, it is possible to immediately request the printer 3 to cancel the execution of the printing when a request to cancel printing occurs. On the other hand, if the application server 21 acquires the request to cancel printing before the printer 3 is notified of the occurrence of the print job in step S206, the creation of the print job is stopped or the print job is deleted without notifying the printer 3.

The printer 3 that has acquired the request to cancel printing transmits a response to the request to cancel printing to the processing control server 2 based on XMPP (S304). In a case where the printer 3 that has acquired the request to cancel printing succeeds in cancelling the printing, the processing control server 2 is notified of the success of cancelling the printing. A case where the printer 3 does not correspond to a request to cancel printing, a case where the printer 3 acquires a request to cancel printing after completing the printing, or a case where the printer 3 acquires a request to cancel printing before starting the printing will be described later.

Next, the printer 3 that has acquired the request to cancel printing stops processing of acquiring the print data from the processing control server 2 and processing of executing printing based on the acquired print data, and deletes the print job including print data that has already been received (S305).

In the processing control server 2 that has been notified of the success of cancelling the printing, the application server 21 acquires a success status of cancelling the printing through the XMPP server 24, and the printer 3 deletes the print job including the print data generated to be transmitted to the printer 3 (S208). Even after the application server 21 deletes the print data, the HTML server 23 can transmit a print data file that has been opened before being deleted upon request. However, printing will never be continued in the printer 3 because processing in which the printer 3 acquires the print data, that is, processing in which the print data is requested to the HTML server 23 has been cancelled in step S305.

Next, the application server 21 creates a print cancellation page for notifying a user of the success of cancelling the printing (S209).

The print cancellation page created by the application server 21 is acquired by the communication terminal 1 through the HTML server 23 (S107), and is displayed by the browser of the communication terminal 1 (S108). As a result, a user of the communication terminal 1 can know that the printing has been canceled in the printer 3.

In a case where a request to cancel printing occurs just after a request to execute printing and before starting the printing, or a case where a request to cancel printing occurs after completing the printing, a response of the printer 3 to the request to cancel printing is made a "not currently printing" error. Also, in a case where it is before starting printing, a print job including print data that has been received can be deleted without starting printing. The application server 21 that has acquired a response of a "not currently printing" error through the XMPP server 24 can consider that a cancellation of printing has succeeded and delete the print job, and also create a printing cancellation page. Needless to say, in a case where a request to execute printing occurs after completion of the printing, it can be possible to consider that a cancellation of printing has failed, and create a web page for notifying a user of the communication terminal 1 of the failure of the cancellation of printing.

Also, in a case where an XMPP connection is not established between the printer 3 and the processing control server 2, it is sufficient to delete a print job by considering that the power of the printer 3 is shut down or abnormality occurs in the communication path.

The present embodiment assumes that the specification of the printer 3 to be registered in the processing control server 2 is not made uniform. Therefore, in a case where the printer 3 acquires a request to cancel printing after starting the printing, there is a good chance that the printing will not be cancelled. In such a case, a response that the processing control server 2 receives by transmitting a request to cancel printing to the printer 3 based on XMPP has a content showing a "not responding" error. When the processing control server 2 receives a response showing a "not responding" error, the processing control server 2 considers that the cancellation of printing has failed, and delays timing of deleting the print data to timing of deleting in a case of normal printing completion. Specifically, the application server 21 can retain the print data without deleting until the application server 21 is notified of completion of the printing by the printer 3.

In sum, the application server 21 determines whether or not the printing will be continued in the printer 3 based on the response received by requesting the printer 3 to cancel the printing, and deletes a print job that includes print data or delays deleting the print job based on the determination results.

According to the above-described embodiment, it is possible to cancel execution of printing without adding a special function to the HTML server 23. Specifically, it is possible to cancel execution of printing in the printer 3 by remote control without increasing load on the processing control server 2. Incidentally, the XMPP server 24 for transmitting a request to cancel printing to the printer 3 is necessary for immediately notifying the printer 3 of the occurrence of a print job. Accordingly, even if the XMPP server 24 is used for transmitting a request to cancel printing to the printer 3, peak load on the XMPP server 24 will not be increased. Specifically, by dispersing processing for a cancellation of printing within the processing control server 2, it is possible to simplify the configuration of the processing control server 2, and reduce the cost for achieving print cancellation processing.

3. Another Embodiment

The technical scope of the invention is not limited to the above-described embodiments. Various modifications such as combination of one or more modification examples described below can be possible without substantially departing from the subject matter of the invention.

For example, the server 2 can be constructed of a plurality of physically independent computers, or can be constructed of a single computer.

Also, the application server 21 can create a print job in response to receipt of e-mail as a print request without using the print control page 5, and thereafter notify the printer 3 of the occurrence of a print job. Then, for example, a user acquires a job management screen of the printer 3 existing in the HTML server 23 by using the browser of the communication terminal 1, and orders deletion of the job and cancellation of the printing from the job management screen. Alternatively, a user transmits e-mail that orders cancellation. Even in this case, the processes of step S207 and the following steps are the same as the above-described embodiment.

Regarding the communication protocol for an always-on connection between the printer 3 and the processing control server 2, a communication protocol other than XMPP can be used. For example, transmission can be conducted by using a push-type communication protocol (protocol that does not need a request from a client to conduct processing from the server to the client) other than XMPP such as SIP (Session Initiation Protocol) or SIMPLE (SIP for Instant Messaging and Presence Leveraging Extensions). Also, if polling is needed for the purpose irrelevant to the above, a pull-type communication protocol used for the polling can be used for transmission.

Needless to say, the invention can be applied to various information devices other than a printer as the processing terminal.

What is claimed is:

1. A processing control server comprising:
    a first communication unit that communicates with a processing terminal by using a first connection based on HTTP;
    a second communication unit that communicates with the processing terminal by using a second connection that is different from the first connection; and
    a processing control unit that transmits object data to the processing terminal based on HTTP after acquiring a printing request, and sends a request to the processing terminal to cancel printing of the object data by using the second connection in response to acquisition of a cancellation request,
    wherein the processing control unit determines whether or not the printing of the object data is continued in the processing terminal based on a response to the request that has been sent to the processing terminal,
    the processing control unit deletes the object data when the processing terminal has a function that cancels the printing of the object data in response to the request that has been sent to the processing terminal and the printing of the object data is not continued in the processing terminal, and
    the processing control unit deletes the object data after completing the printing of the object data when the processing terminal does not have the function that cancels the printing of the object data in response to the request that has been sent to the processing terminal and the printing of the object data is continued in the processing terminal.

2. The processing control server according to claim 1 further comprising a third communication unit that communicates with a management terminal,
    wherein the cancellation request is acquired from the management terminal by using the third communication unit.

3. The processing control server according to claim 1, further comprising a plurality of separate computers in which the first communication unit, the second communication unit, and the processing control unit are installed, respectively.

4. The processing control server according to claim 1, wherein the processing control unit sends the request to cancel the printing of the object data by using the second connection while transmitting the object data by using the first connection in response to acquisition of the cancellation request before completing transmission of the object data.

5. A processing control method comprising:
    transmitting object data to a processing terminal by using a first connection based on HTTP in response to a printing request;
    sending a request to the processing terminal to cancel printing of the object data by using a second connection that is different from the first connection based on a push-type protocol in response to a cancellation request;
    determining whether or not the printing of the object data is continued in the processing terminal based on a response to the request that has been sent to the processing terminal;
    deleting the object data when the processing terminal has a function that cancels the printing of the object data in response to the request that has been sent to the processing terminal and the printing of the object data is not continued in the processing terminal, and
    deleting the object data after completing the printing of the object data when the processing terminal does not have the function that cancels the printing of the object data in response to the request that has been sent to the processing terminal and the printing of the object data is continued in the processing terminal.

6. A processing terminal comprising:
    a first communication unit that communicates with a processing control server by using a first connection based on HTTP;
    a second communication unit that communicates with the processing control server by using a second connection that is different from the first connection; and
    a processing unit that acquires object data from the processing control server by using the first connection and conducts a predetermined printing of the object data upon acquiring a printing request,
    wherein the processing unit cancels the printing of the object data upon acquiring a cancellation request by using the second connection during acquisition of the object data when the processing terminal has a function that cancels the printing of the object data in response to the cancellation request, and
    the processing unit does not cancel the printing of the object data upon acquiring the cancellation request by using the second connection during the acquisition of the object data when the processing terminal does not have the function that cancels the printing of the object data in response to the cancellation request.

7. The processing terminal according to claim 6, wherein the second connection is a push-type communication protocol that can conduct communication even when the first communication unit is in the process of communication by using the first connection, and the second communication unit maintains a state of being able to receive communication from the processing control server by using the second connection even when the first communication unit is in the process of communication by using the first connection.

* * * * *